(12) United States Patent
Bogoslofski

(10) Patent No.: US 6,772,927 B2
(45) Date of Patent: Aug. 10, 2004

(54) LOAD CARRIER FOR SPORTS EQUIPMENT

(75) Inventor: Kevin S. Bogoslofski, Southington, CT (US)

(73) Assignee: Thule Sweden AB, Hillerstorp (SE)

(*) Notice: Subject to any disclaimer, the term of this patent is extended or adjusted under 35 U.S.C. 154(b) by 0 days.

(21) Appl. No.: 10/032,122

(22) Filed: Dec. 31, 2001

(65) Prior Publication Data

US 2002/0096546 A1 Jul. 25, 2002

Related U.S. Application Data

(60) Provisional application No. 60/311,912, filed on Aug. 13, 2001.

(51) Int. Cl.$^7$ ................................................ B60R 9/00
(52) U.S. Cl. ...................... 224/324; 211/19; 211/20; 224/314; 224/321; 224/325
(58) Field of Search ................................ 224/324, 325, 224/314, 315, 321, 329, 924; 211/19, 20

(56) References Cited

U.S. PATENT DOCUMENTS

| | | | | |
|---|---|---|---|---|
| 4,452,385 A | * | 6/1984 | Prosen | 224/493 |
| 5,056,700 A | * | 10/1991 | Blackburn et al. | 224/324 |
| 5,118,020 A | * | 6/1992 | Piretti | 224/493 |
| 5,135,145 A | * | 8/1992 | Hannes et al. | 224/493 |
| 5,259,542 A | * | 11/1993 | Newbold et al. | 224/324 |
| 5,305,936 A | * | 4/1994 | Nusbaum | 224/324 |
| 5,598,960 A | * | 2/1997 | Allen et al. | 224/324 |
| 6,431,423 B1 | * | 8/2002 | Allen et al. | 224/509 |

* cited by examiner

Primary Examiner—Gregory Vidovich
Assistant Examiner—Maerena Brevard
(74) Attorney, Agent, or Firm—Novak Druce LLP

(57) ABSTRACT

A bicycle carrier adapted to be mounted on the rear of a vehicle. The carrier comprises first and second mounting members and a pair of horizontally spaced bicycle supporting arms connected to the mounting members. The mounting members are pivotably connected for relative rotation about a horizontal pivot axis between a plurality of adjusted positions. The carrier includes indicia corresponding to each of the adjusted positions of the mounting members, so that a user can quickly return the carrier to the same adjusted position. The supporting arms carry cradles formed of an elastic material for receiving a bicycle. Each cradle includes a curved supporting surface for receiving a bar of the bicycle frame, and an integral strap which can be extended over the bar to retain the bar within the cradle. An anti-sway bar hangs downwardly from at least one of the supporting arms for resisting swinging movement of a bicycle.

21 Claims, 11 Drawing Sheets

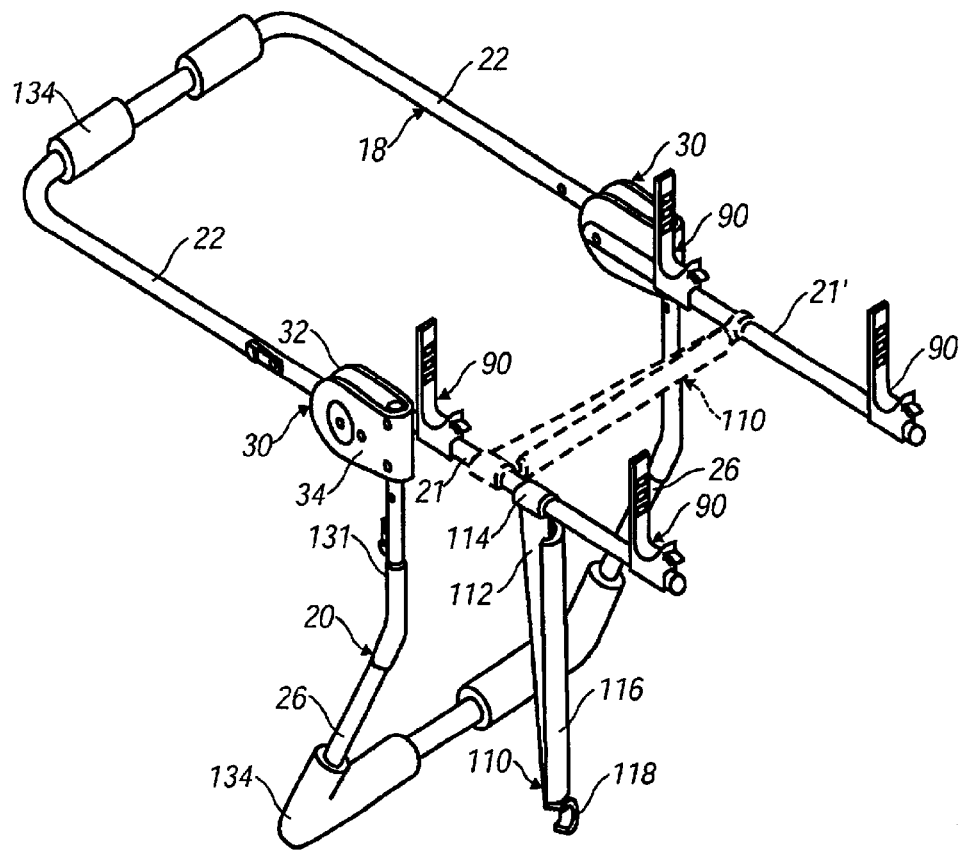
FIG. 2
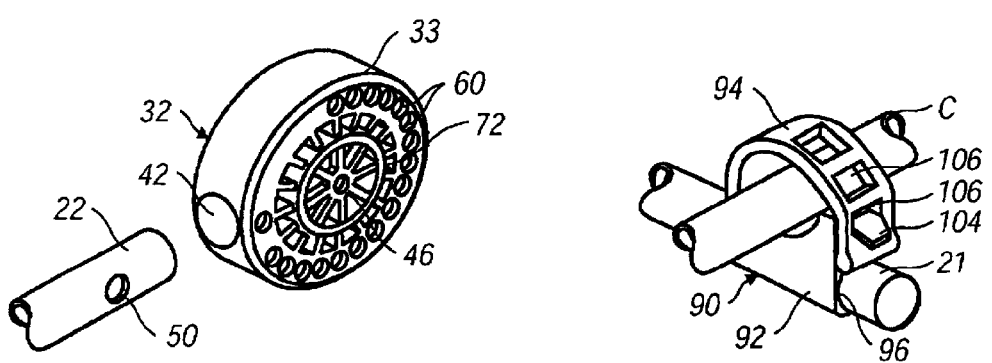
FIG. 3  FIG. 4

LOAD CARRIER FOR SPORTS EQUIPMENT

RELATED PATENT APPLCATIONS

The present application claims the benefit of U.S. Provisional Application No. 60/311,912 filed Aug. 13, 2001.

FIELD OF THE INVENTION

The present invention relates generally to carriers mountable to vehicles for transporting sports equipment. More particularly, it relates to carriers typically mountable to a rear end of a vehicle for transporting bicycles thereon.

BACKGROUND OF THE INVENTION

Many types of sports equipment are useable only under certain conditions and/or in specific locales. Examples of such sports equipment include surfboards that are ridden at beaches and snow skis that are normally used at ski resorts. The beach and ski areas are often remotely located from the homes of those who use them, therefore the need for transporting sports equipment upon vehicles to these locations has long been recognized.

In the instance of bicycling, a rider will often desire to ride his or her bicycle in different areas without having to ride the bicycle to those areas. To facilitate the transportation of one or more bicycles, bicycle carriers mountable to passenger vehicles have been developed. The carriers are typically mountable to the rear end of a vehicle, however, the carriers may be configured to be mounted at other locations upon a vehicle as long as the location is convenient for loading the bicycles onto the carriers and neither the bicycles nor the carrier inconveniences the driver or obstructs visibility. Examples of such bicycle carriers are disclosed in U.S. Pat. No. 5,211,323 to Chimenti et al for a BICYCLE CARRIER ADAPTED TO BE MOUNTED ON THE BACK OF A VEHICLE, U.S. Pat. No. 5,826,767 to Chimenti et al for a BICYCLE CARRIER ADAPTED TO BE MOUNTED ON THE BACK OF A VEHICLE and U.S. Pat. No. 5,363,996 to Raaber et al also entitled BICYCLE CARRIER ADAPTED TO BE MOUNTED ON THE BACK OF A VEHICLE, each of which is commonly owned together with the present invention and whose disclosures are expressly incorporated herein.

The carriers of the above referenced patents are mountable to the rear end of a carrying passenger vehicle. The carriers incorporate rigid mounting members that engage surfaces of the vehicle and clippable straps that when tightened secure the carrier to the vehicle. The carrier further includes support arms that extend away from the vehicle and upon which one or more bicycles may be secured. In several of these exemplary carriers, once the carrier is properly configured for the particular vehicle upon which it is to be installed and it is secured thereupon, the orientation of the mounting members and support arms is substantially fixed so that relative movement therebetween is prevented.

A sports equipment carrier may not always be utilized on the same carrying vehicle or even similar vehicles. In fact, body configurations vary widely among different passenger vehicles. If the mounting configuration of the carrier were fixed, each carrier would only be installable upon a select group of vehicles. This would be highly inconvenient to persons wishing to use a carrier on vehicles that are not similarly configured. Therefore, the ability to variably adjust the mounting apparatus of an equipment carrier is desirable. Furthermore, the provision of indicia of proper orientation for a particular vehicle is also beneficial to the user. In this way, the need for trial-and-error adjustment is prevented and the installation process is streamlined.

A common feature of many of these known carrier designs is the inclusion of a pair of rearwardly extending arms adapted to receive bicycles to be transported thereupon. In some of these designs, these arms are fixed with respect to the hub to which these arms and frame members are joined together. Alternatively, the hub assembly at which the mounting members and the equipment support arms are interconnected may be variably positioned from vehicle to vehicle. As such, it has also been recognized as desirable to have the ability to variably position the equipment support arm so that the arm may be appropriately oriented into a carrying configuration, regardless of the vehicle to which it is mounted. The hub assembly required to facilitate the variable positioning of the arms relative to the hub, however, is typically quite complex. To accommodate these capabilities, certain designs include mated disc-type members that must rotate relative to one another, as well as lockingly interconnect when a desired orientation is achieved. Not only are these arrangements often not user-friendly because of their complexity, but they are commensurately expensive to manufacture. As a result, more elegant solutions have been sought to simplify such hubs' construction and operation, while at the same time lowering their cost.

Another aspect of such carriers often suffering from deficient design is the cradle upon which the bicycles rest, and by which the bicycles are secured to the carrier. Typically, these cradles provide an important buffer between the carrier and the bicycle. Different configurations for such cradles usually include a securing band or strap that wraps around the supported bicycle frame member. A problem for the user is that both hands are normally occupied lifting the bicycle up to the carrier and positioning it on the cradle(s). In traditional designs, the band or strap has often been provided as a separate element to the actual support for the bicycle. As shown in FIG. 12, a replication of FIG. 2 from U.S. Pat. No. 4,681,247 entitled LOAD SUPPORT PEDESTAL, the use of flexible belting in conjunction with a cradling base unit has been previously employed as a combination. A similar arrangement is shown in FIG. 11, a replication of FIG. 6 from U.S. Pat. No. 5,135,145 entitled MOUNTAIN BIKE RACK, in which the use of flexible elastic cord is employed in conjunction with a cradling base unit. In each of these examples of known designs, both the belting and elastic cord, however, are each so flexible that neither is capable of supporting its own weight and naturally flops across the supporting surface of the cradling base unit portion. This capability of the flexible belt and elastic cord to flop across the surface upon which the bicycle is to be placed is obviously undesirable in that the belt or cord must be moved before the bicycle can be properly installed thereupon. As pointed out above, this is often at a great disadvantage to the user since both hands are occupied with manipulating the bicycle itself. In a related aspect, if the flexible belt or cord has not flopped across the bicycle-receiving surface of the cradling base unit, it has flopped there away from, but must be fished for by the operator in order to affect properly securement across the bicycle frame member. As a result of these observations, it has been appreciated that it is desirable to have the securing strap of the cradle assembly maintained in a readied position for securement about the bicycle frame member, but out of the way until purposefully positioned across the bicycle frame member resting on the cradle base unit.

In a related aspect, it has also been found that too many component-pieces in the cradle's design is also detrimental.

Therefore, the fewer component-pieces the better, and also, the more functional features that can be incorporated into these minimized component-pieces the better.

In view of these observations, a need exists for sports equipment carriers having capabilities for variably configuring the mounting apparatus of the carrier, absorbing potentially detrimental forces communicated through the carrier, and damping rebounding forces or bouncing actions induced in the carrier's structure. These features would prove to be beneficial if individually available, or in advantageous combinations.

SUMMARY OF THE INVENTION

In an effort to alleviate the detrimental and deficient effects described above, several invention are disclosed which incorporate a plurality of beneficial and advantageous aspects for a load carrier arrangement. One such feature is the unique design for associating a load carrying member, such as a bicycle support arm, with the hub upon which it operates. According to one aspect of the disclosed inventions, a socket is provided in the hub that is designed to insertably receive an insert portion of a load carrying member such as a bicycle support arm. The carrying member is arranged to rotate or twist within the socket. In this way a unique and elegant solution is provided for transitioning such an arm between an extended load carrying or transporting orientation and a compacted storable orientation. It also provides an simple method for making adjustments to the relative orientation of the arm with respect to the balance of the carrier. For instance, if the arm needs to be lowered slightly to be placed in a horizontal orientation when mounted upon a particular vehicle, merely performing a twist of one or both of the arms can provide a quick solution. Similarly, the arms of a pair on a carrier can be leveled; this is enabled by the fact that the arms can be independently adjusted without any changes at the hubs other than permitting rotation of the inserted portion of the arm being manipulated in its socket in the hub.

Because a simple locking arrangement is employed, namely the disclosed spring-biased pin-in-aperture configuration, both the extended and retracted configurations of the carrying members or arms are easily locked and unlocked by an operator. Still further, because of this simple arm-in-socket and biased insert pin arrangement, the carrying member or arm is easily removed from the hub simply by disengaging the locking pin by pulling it against its biasing spring from mating engagement with the receiving apertures on the arm, and then pulling the arm out of the socket. This greatly facilitates shipping where compact packing is of paramount importance.

The construction of the hub arrangement of the exemplary embodiment of FIG. 13 in which essentially two halves are simply joined together saves manufacturing costs and reduces the number of parts required to establish a working hub assembly.

In another aspect, another simple pin-in-aperture configuration is utilized for establishing proper fit of certain frame components relative to the hub of the carrier.

Still further, a scheme for providing a universal fit guide which can be utilized by a number of carriers is disclosed. By using like indicators on differently configured carrier orientation-fixing arrangements, such as the at least two different and alternative hub configurations that are described herein, a single universal fit guide can be produced which specifies one correlator or indicia for a particular fit, which will normally correspond to a particular vehicle, or group of vehicles, and which appears on the several different carriers. Arrangement of any of the properly marked carriers according to the single specified indicia for a particular fit, such as to a particular vehicle, will result. In this way, substantial economies can be realized through the uniformity fostered across different products when a single fit guide can be used for all.

In yet another aspect, several unique cradle arrangements have been disclosed. Among other features, one design is described in which the more dislocation-tending force that is exerted upon the cradle, the greater the anchoring power of the cradle to the carrier. In another aspect, the securing strap is configured with respect to the base of the cradle so that the strap extends substantially upward and away from the base, and is maintained in that orientation until purposefully bent over for securing a bicycle frame to the cradle. In this way, the strap is continuously readied for securement, but out of the way from and clear of the exposed surface of the base upon which a user must install a bicycle to be transported thereupon. To achieve this performance, the material of construction for the strap is selected so that it is sufficiently rigid to support its own weight in a substantially upright orientation when substantially unaffected by external forces, while at the same time being sufficiently flexible to be bent over the bicycle frame member that is to be secured upon the cradle after proper positioning of the bicycle thereupon.

In the several embodiments of the present invention that are disclosed herein, it is contemplated that the carrier may be associated with a transporting vehicle in a number of ways. The carrier may be directly connected to the rear of the vehicle. Alternatively, the carrier may be coupled to the vehicle with one or more components interposed therebetween. As an example, the carrier may be secured to a hitch assembly that is in turn connected to the vehicle. In any event, when the present invention is described herein as being mounted to, secured to, or otherwise associated with a vehicle, it is to be understood that the association may be direct or indirect with intermediate components therebetween.

In summary, inclusion of one or more of the above described features in a sports equipment carrier enhances the carrier's usefulness, its compatibility with variably configured carrying vehicles, and its ease of manufacture, installation and use.

BRIEF DESCRIPTION OF THE DRAWINGS

Certain embodiments of the disclosed inventions will now be described in greater detail and exemplarily shown in the associated drawings in which like reference numerals have been used to indicate like and similar components, arrangements of components, and functional features of the same. The illustrative drawings disclose exemplary, and in some case alternative embodiments of the inventions in which regard:

FIG. 2 is a perspective view of that bicycle carrier, with securing straps thereof being deleted for clarity, and with a anti-sway bar shown in phantom lines in a carrier-storing position;

FIG. 3 is a perspective view of a hub portion of that carrier, and a fragment of a leg of a mounting member which is to be inserted into a socket of the hub;

FIG. 4 is a fragmentary perspective view of a cradle of that carrier, the cradle being in a bicycle frame-retaining condition;

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
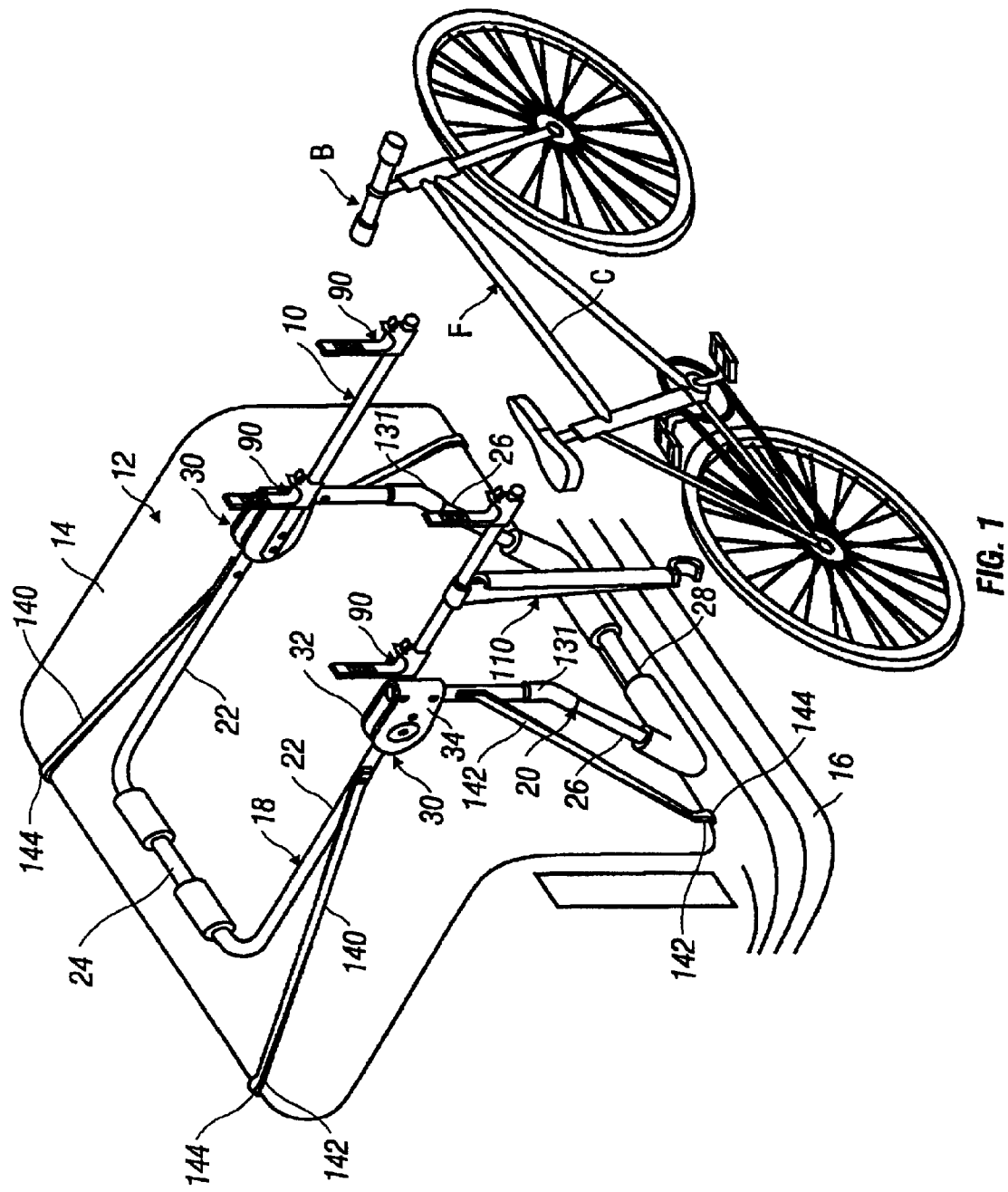
FIG. 1 is a perspective view of a bicycle carrier according to one embodiment of the presently disclosed inventions designed to be mounted on the rear end of a vehicle.
Figure 5:
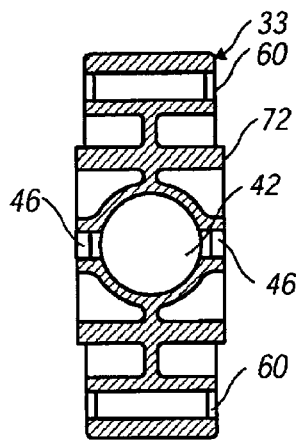
FIG. 5 is a cross-sectional view taken through the hub along the line 5—5 in FIG. 6.

Referring to the Figures, one exemplary embodiment of a bicycle carrier 10 is shown in FIG. 1 as being mounted on the rear of a vehicle 12. The vehicle 12 includes a trunk lid 14 and a bumper 16.

The carrier 10 comprises a frame formed by a pair of mounting members 18, 20, and a pair of bicycle supporting arms 21, 21' project rearwardly from the frame. An upper one of the mounting members 18 is U-shaped and comprises a pair of leg portions 22 interconnected by a bight portion 24. Likewise, a lower one of the mounting members 20 is U-shaped and includes a pair of leg portions 26 interconnected by a bight portion 28.

The mounting members are interconnected by two pivot-forming structures 30, each of which includes first and second brackets 32, 34. The first bracket 32 is affixed to the upper mounting member 18, and the second bracket 34 is affixed to the lower mounting member 20.

Figure 10:
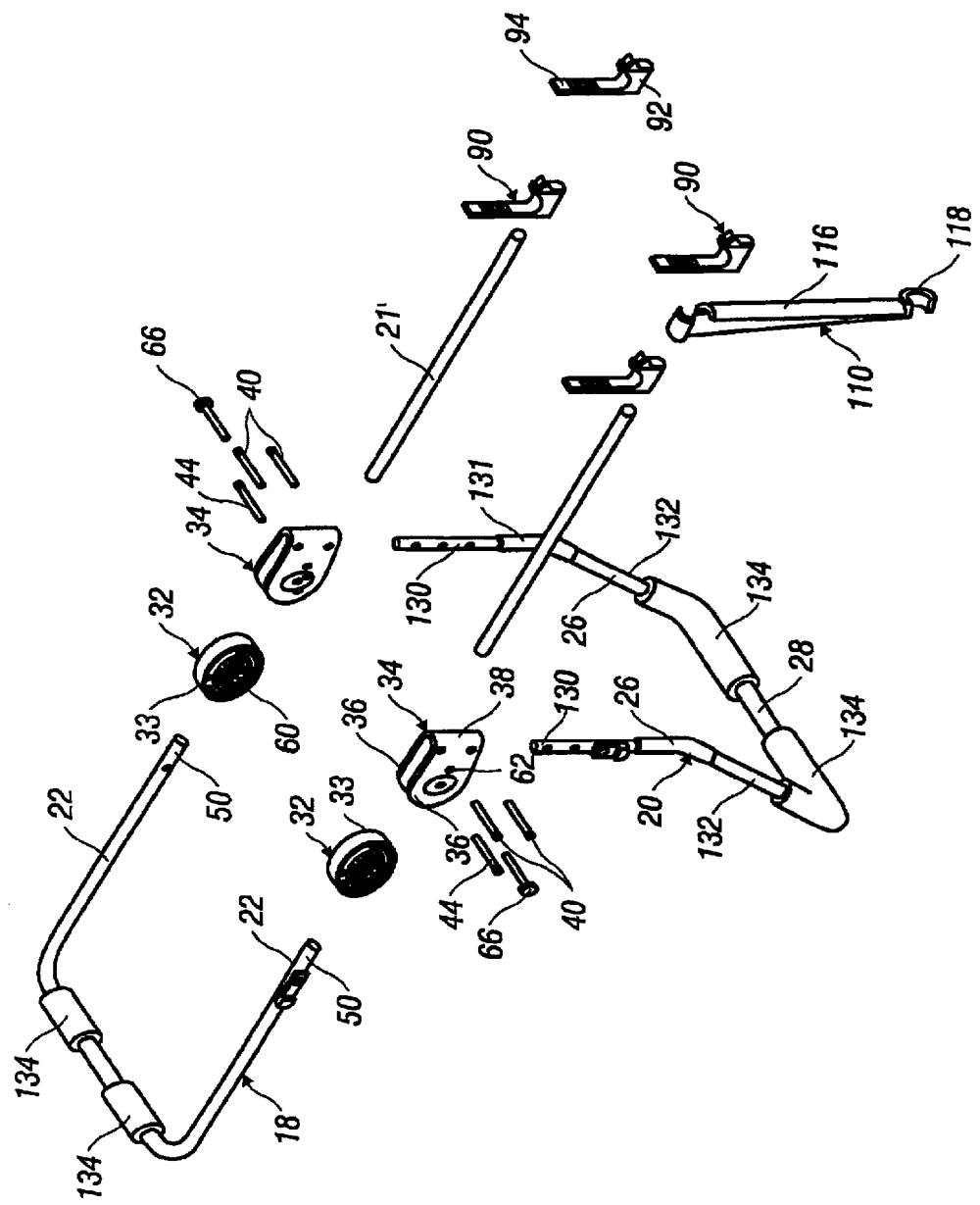
FIG. 10 is an exploded perspective view of the bicycle carrier depicted in FIG. 2 with the cradles disposed in an unaffected, bicycle-receiving configuration.
Figure 11:
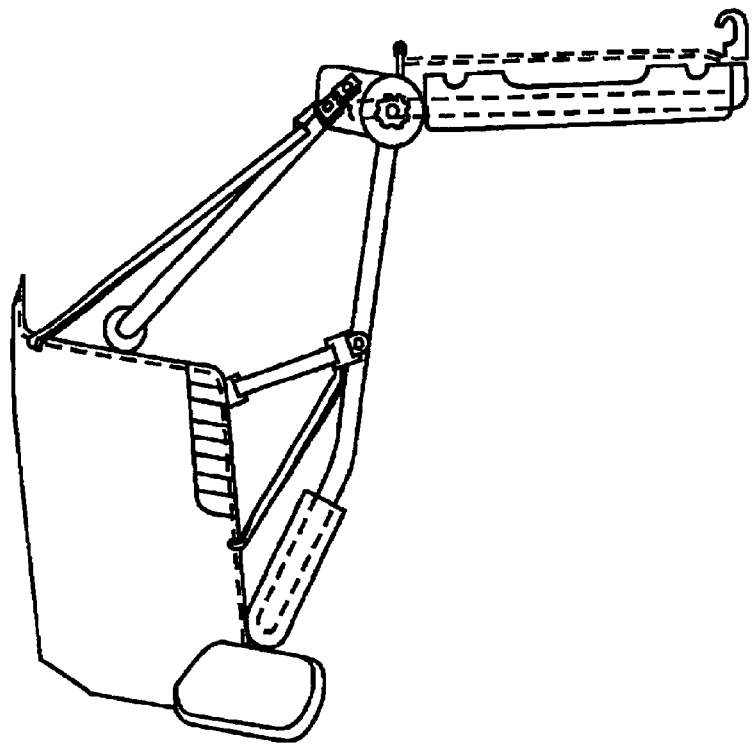
FIG. 11 is a side elevational view of a previously known design in which an elastic cord is utilized in an effort to retain bicycles on a carrier.
Figure 12:
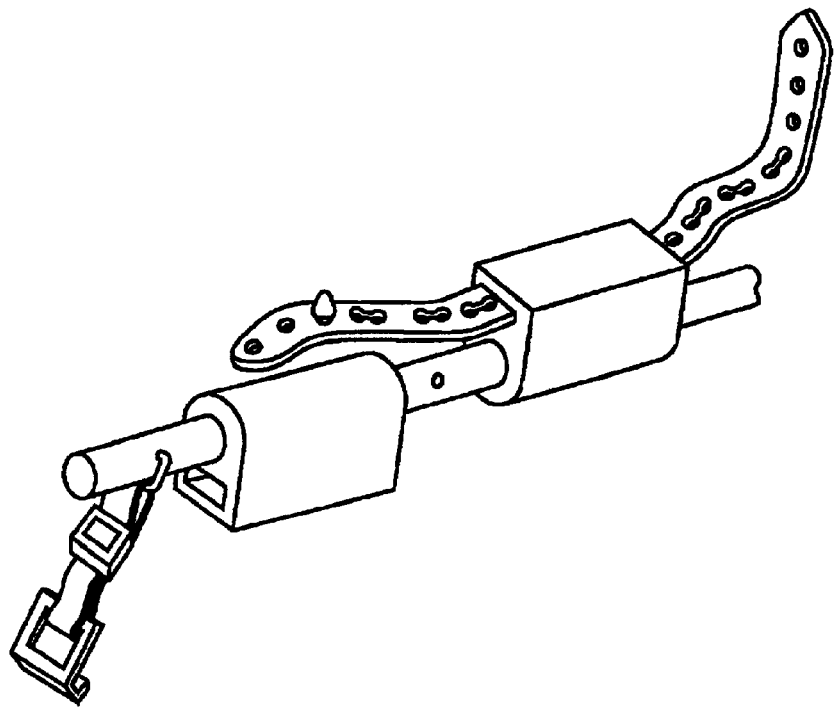
FIG. 12 is a perspective view of a previously known design for an equipment support utilizing flexible belting in conjunction therewith.

The second bracket 34 is U-shaped and includes a pair of leg portions 36 (see FIGS. 8 and 10) interconnected by a bight portion 38. The bight portions 38 forms a socket which receives the upper end of a leg portion 26 of the lower mounting member 20 and retains the leg portion by means of pins in the form of rivets 40 which pass through aligned holes in the leg 26 and leg portion 36.

Figure 8:
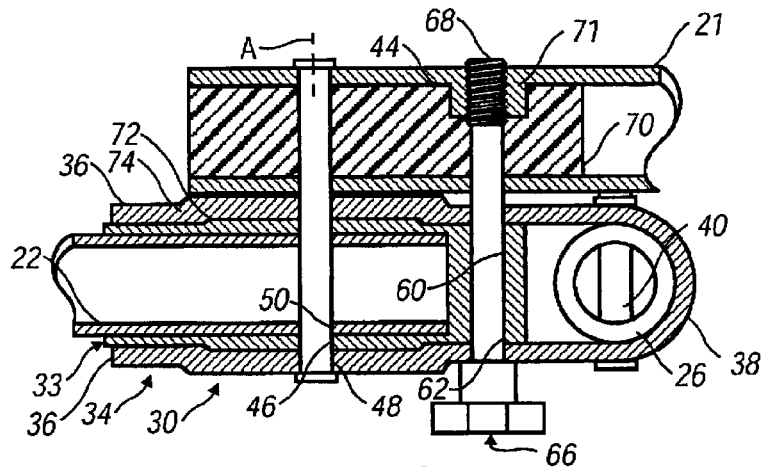
FIG. 8 is a sectional view taken along the line 8—8 in FIG. 7 after a leg of an upper mounting member has been inserted into a hub of the pivot-forming mechanism.

Each of the first brackets 32 comprises a generally cylindrical hub 33 having a radially extending socket portion 42 for receiving a leg portion 22 of the upper mounting member 18 (see FIG. 3). A pin in the form of a bolt 44 extends through aligned openings 46, 48, 50, 52 formed in the hub 33, the bracket 34, the leg 22, and the supporting arm 21 (or 21'), respectively, as shown in FIG. 8. The pin forms a pivot axis A about which the hub 33 can rotate relative to the bracket 34.

An internal wall of the socket 42 could include a projection (not shown) sized to enter a groove formed in an outer wall of the leg to aid in properly aligning the leg within the socket. The hub 33 includes a plurality of through-holes 60 (see FIG. 6) arranged in a circular path concentrically about the pivot axis A. The legs 36 of the bracket 34 include two aligned holes 62 (see FIGS. 7 and 8) spaced from the axis A by the same distance as the holes 60. Hence, by rotating the hub 33 about the axis A, the holes 60 can be brought sequentially into alignment with the aligned holes 62. By inserting a threaded bolt 66 through the aligned holes 62, 60 and into a threaded hole 68 disposed within the supporting arm 21 (or 21'), the mounting members 18, 20 will be locked in a particular adjusted position. The number of possible positions of adjustment operating or use position. The threaded hole 68 can be provided in the supporting arm 21 (or 21') in any convenient fashion, such as by means of a polypropylene plug 70 affixed within the supporting arm 21. The plug 70 includes holes through which the rivet 44 and bolt 66 extend, and carries a threaded nut 71 which receives the bolt 66.

Figure 9:
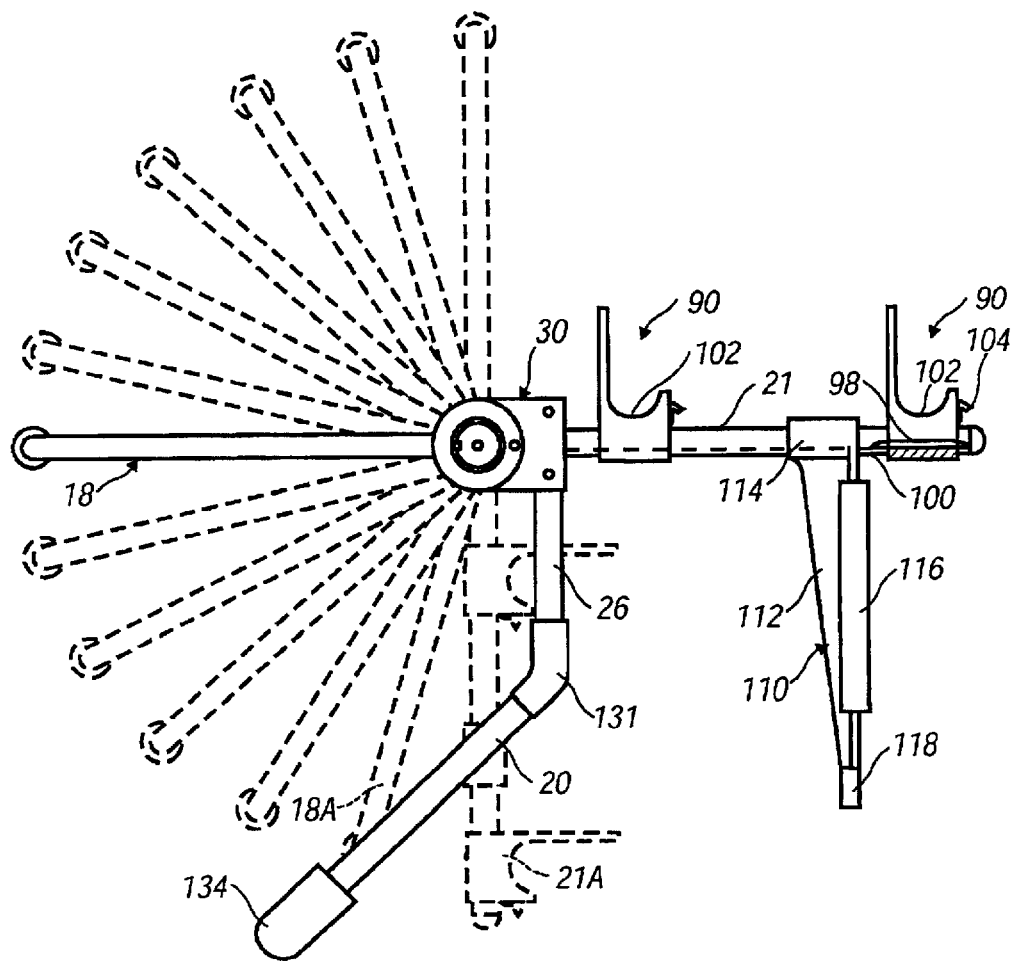
FIG. 9 is a side elevational view of the carrier, depicting various positions of adjustment of that carrier in broken lines.

The hole 62 of the bracket 34 and the hole 68 of the supporting arm 21 are located such that when the supporting arms 21, 21' are in their use position, they are oriented substantially perpendicular to the upper portions of the legs 26 of the mounting member 20 as the carrier is viewed from the side in a direction parallel to the axis A (see FIG. 9).

Rotational support for the hub 33 within the bracket 34 is enhanced by the engagement between a circular projection 72 formed on each of the outer surfaces of the hub, and a circular recess 74 formed in each of the inner surfaces of the bracket legs 36 (see FIG. 8). The engagement between those projections and recesses 72, 74 forms a rotary support between the hub 33 and bracket 34.

Figure 7:
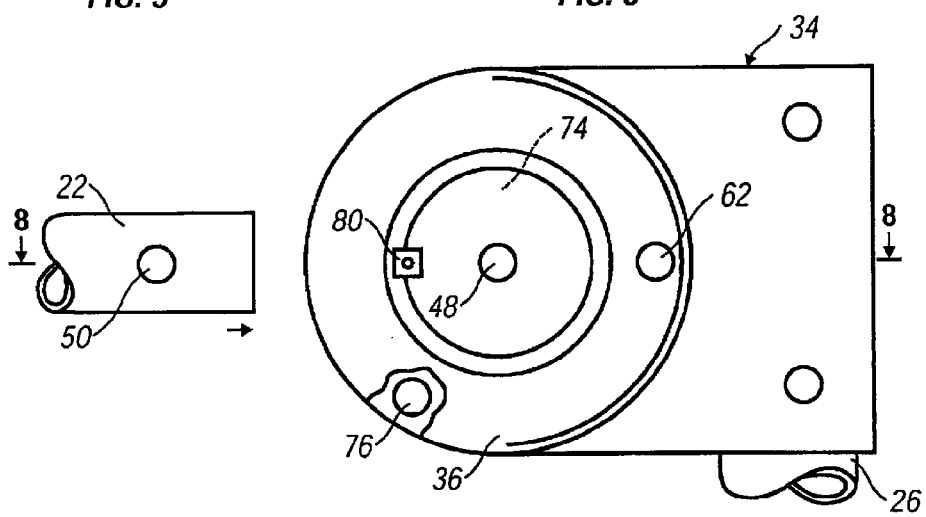
FIG. 7 is a side elevational view of a portion of that carrier which forms a pivot connection between two mounting members of the carrier.

In order to enable alignment between the holes 60 of the hub 33 and the holes 62 of the bracket to be more easily attained, each of the inside surfaces of the bracket 34 is provided with a projection 76 which is spaced from the axis A by the same distance as the holes 60 of the hub are spaced from that axis. In FIG. 7 a part of one of the legs 36 is broken away to show the projection 76 located on the opposite leg 36. Thus, as the hub 32 rotates, the holes 60 will sequentially become aligned with, and receive, the projections 76. The projections do not lock the hub in its various positions of adjustment, but merely offer a yieldable resistance against further hub rotation. The projections 76 are located such that when they are nested within one of the holes 60, another of the holes 60 will be aligned with the holes 62 of the bracket, as depicted in FIG. 8, thus facilitating insertion of the bolt 66 to lock the carrier in that particular adjusted position.

It will be appreciated that when relative rotation about axis A occurs between the upper and lower mounting members 18, 20, such as when changing from one adjustment position to another, the angle formed between those mounting members changes, as is evident from FIG. 9 which depicts various adjusted positions of the carrier in broken lines. In so doing, the carrier 10 is capable of being mounted on the rears of vehicles of different configurations. Thus, each position of adjustment is suited to one or more particular vehicle model. When a user attempts to re-attach the carrier to a vehicle, or transfer the carrier from one vehicle to another, it would be highly inconvenient to have to repeat the time-consuming procedure of experimenting with different adjustment positions of the carrier.

Figure 6:
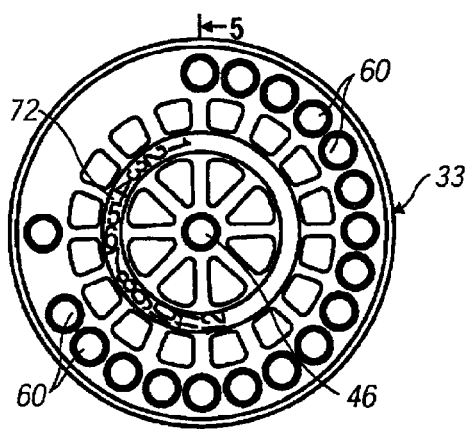
FIG. 6 is a side elevational view of the hub depicted in FIG. 3.

In order to avoid that inconvenience, the present invention provides means for identifying the various adjustment positions. As depicted in FIG. 6, indicia in the form of a series of numbers, i.e., numbers 1 through 12, is disposed on one of the sides of the hub 33. Those numbers are arranged in a circular path which is concentric with the axis A. One of the legs 36 of the bracket 34 includes an opening 80 (see FIG. 7) which is spaced the same distance from the axis A as are the numbers formed on the hub. The opening is situated so that whenever the mounting members have been indexed to any one of their adjusted use position (excluding a storage position), a number is visible through the opening 80. For example, the number "6" is visible in FIG. 7.

The numbers can be provided in any suitable manner, such as by being integrally molded with the hub and then colored in an appropriate manner so as to be clearly distinguishable.

Hence, once a user has adjusted the carrier to suit a particular vehicle, the user need only record the particular position number which is disposed in the opening 80 in order to be able in the future to quickly return the carrier to the position suited to that vehicle. If the user owns a number of vehicles, then he will record the position numbers pertinent to each vehicle.

Furthermore, it is possible for the manufacturer of the carrier to provide the user with a listing which correlates various vehicle models to the position numbers. Hence, upon purchasing the carrier, the user can immediately index the carrier to its proper position without the need to experiment with different positions.

In order to support a bicycle B without scratching the frame, bicycle-receiving cradles 90 formed of an elastically flexible material, such as rubber or soft plastic, are provided to receive and cradle a bar C of the bicycle frame F. Each cradle 90 includes a base 92 and a strap 94 which are of integral, one-piece construction. The strap 94 normally extends substantially upwardly from the base 92 as shown in FIGS. 1, 2, 9 and 10, but can be flexed to extend across a bicycle receiving surface 102 of the cradle 90 to retain a bicycle frame, as shown in FIG. 4. The base 92 includes a through-hole 96 which is adapted to receive a supporting arm 21 (or 21'). The supporting arm makes a snug frictional fit with the hole 96, so the cradle 90 can be slid along the supporting arm and then be held in position by friction.

A wall of the through-hole 96 includes a projection 98 which is received in a longitudinal channel 100 formed in an outer surface of the supporting arm 21 (or 21'). The projection tends to retain the cradle in a prescribed circumferential position on the supporting arm, so that the bicycle-receiving surface 102 of the cradle faces upwardly.

That surface 102 is formed on the base 92 and is of curved shape to generally conform to the curvature of the bar C of the bicycle frame. The base 90 carries a metal fastener tab 104 which is disposed on a side of the surface 102 opposite that of the strap 94. The tab 104 can be mounted in the base in any suitable fashion.

The strap 94 includes a plurality of fastening holes 106 (see FIG. 4) which are sized to receive the tab 104. Thus, once the bar C of the bicycle frame has been placed onto the surfaces 102 of two of the cradles, the straps 94 are wrapped around the bar C and fastened to the tab 104, as depicted in FIG. 4. The bar C will be held in place without any metal-to-metal contact which could scratch the bar.

Two pairs of cradles 90 can be provided to enable two bicycles to be supported simultaneously on the supporting arms. During vehicle movement, there may occur a tendency for the bicycles to swing about axes defined by the bars C during movement of the vehicle. In order to prevent bicycle-to-bicycle contact during such swinging movement, there is provided an anti-sway bar 110. The anti-sway bar 110 comprises an arm 112 having a hollow sleeve 114 at its upper end. The sleeve 114 receives a supporting arm 21 to enable the anti-sway bar 110 to be slid longitudinally therealong. Disposed over a front face of the arm 112 is a cover 116 formed of a relatively soft material such as rubber or a soft plastic. At its lower end, the arm 112 is shaped like a hook 118. The anti-sway bar is positioned intermediate the front and rear pairs of cradles and hangs vertically downwardly such that if the bottom of a rear bicycle swings forward toward a front bicycle, the bottom of the rear bicycle will strike the soft cover 116 of the anti-sway bar 110. Consequently, damage to the bicycles as the result of bicycle-to-bicycle contact will be avoided.

The anti-sway bar 110 is longitudinally adjustable along the supporting arm 21 and the sleeve 114 is snugly engaged with the supporting arm 21. By applying sufficient force to the anti-sway bar 110 to overcome the frictional contact with the supporting arm, the position of the anti-sway bar can be changed.

For carrier-storage purposes, the anti-sway bar 110 can be swung about the axis of the supporting arm 21 until the hook 118 snaps onto the other supporting arm 21', as depicted in phantom lines in FIG. 2. Thus, the carrier will be rendered more compact for storage purposes than if the anti-sway bar 110 were permitted to hang free.

While the anti-sway bar 110 limits forward swinging movement of the rear bicycle, the upper portions 130 of the legs 26 of the lower mounting member 20 perform a similar function with respect to a front bicycle. When the carrier has been properly mounted on a vehicle, the upper portions 130 of the legs 26 will be oriented substantially vertically, and the supporting arms 21, 21' (which have only one use position) will be oriented substantially horizontally. Hence, the leg upper portions 130 will be conveniently suited to limit the forward swinging movement of the front bicycle.

Pads 131 are provided on the legs 26 to prevent the bicycle from being damaged by the leg portions 130.

If desired, the legs 26 and the anti-sway bar 110 could be provided with straps to enable the front and rear bicycles to be attached to the legs 26 and anti-sway bar, respectively, to prevent swinging of the bicycles.

The lower portions 132 of the legs 26 are inclined inwardly and downwardly from the upper portions 130 to form obtuse angles therebetween. Hence, the bight portion 28 of the lower mounting member 20 will be properly located for engaging the rear bumper of the vehicle, as depicted in FIG. 1.

The vehicle-engaging portions of the carrier are provided with soft cushions 134 to prevent the vehicle from being scratched by the carrier.

The carrier is affixed to the vehicle by means of upper and lower securing straps 140, 142 (see FIG. 1) which carry conventional hooks 144 and adjusting buckles 146. The hooks grasp portions of the vehicle body, such as edges of the trunk lid for example, and are drawn-up tight by means of the buckles. By loosening the straps at the buckles, the hooks can be easily removed.

To render the carrier more compact for storage purposes, the anti-sway bar 110 is swung to its position wherein the hook 118 snaps onto the supporting arm 21'. Then, the bolt 66 is removed to enable the mounting members 18, 20 and the supporting arms 21, 21' to be swung about the axis A so as to lie more closely together. Such a compact condition of the carrier can be visualized in FIG. 9 wherein the lower mounting member could occupy the solid line position shown therein; the upper mounting member could occupy the broken line position 18A; and the supporting arms could occupy the broken line position 21A. While the mounting portions 18, 20 cannot be folded so as to lie in the same plane, they can be folded sufficiently to cause the size of the carrier to be substantially reduced to provide for convenient storage.

Although, not essential, the bracket 34, and the hub 33 could be provided with holes that are aligned in the storage position and which are also aligned with the hole 68 of the supporting arms, so that the bolt 66 can be reinserted to hold the carrier in its storage position.

In operation, when a user desires to install the carrier 10, the bolt 66 is removed, and the frame 18, 20 of the carrier is adjusted to a position fitting a particular vehicle 12 by rotating the mounting member 18 about axis A so that when the carrier rests against the vehicle, the supporting arms 21, 21' extend substantially horizontally. Then the bolt 66 is reinserted, and the hooks 144 of the straps 140, 142 are positioned to grasp convenient edges of the vehicle body in a conventional manner.

The user may now observe and record the position or index number which appears in the opening 80 (FIG. 7), so that, in the future, the carrier can be quickly indexed to that same position. The manufacturer could provide a listing of vehicle models and the corresponding index numbers of the carrier, so that the user would never have to experiment with different positions of the frame.

Once the carrier has been installed, one or more bicycles 83 are mounted on the cradles 90. If two bicycles are to be mounted, the cradles 90 can be adjustably positioned along the supporting arms 21, 21' to space the front and rear pairs of cradles apart by a distance commensurate with the size of the bicycles.

The cradle straps 94 are then wrapped around the bar C of the bicycle frame F (FIG. 4) to provide 360 degree securement of that bar. Due to the soft, elastic nature of the cradle, the bicycle bar C will not contact metal so as to become scratched.

The anti-sway bar 110 (see FIG. 2) is positioned closely adjacent the rear bicycle to resist swinging of that bicycle during vehicle travel, and thereby prevent bicycle-to-bicycle contact.

When the carrier is removed from the vehicle and stored, the anti-sway bar 110 can be rotated to a convenient storage position (see broken lines in FIG. 2) wherein the hook 118 snaps onto the other supporting arm 21'.

Figure 13:
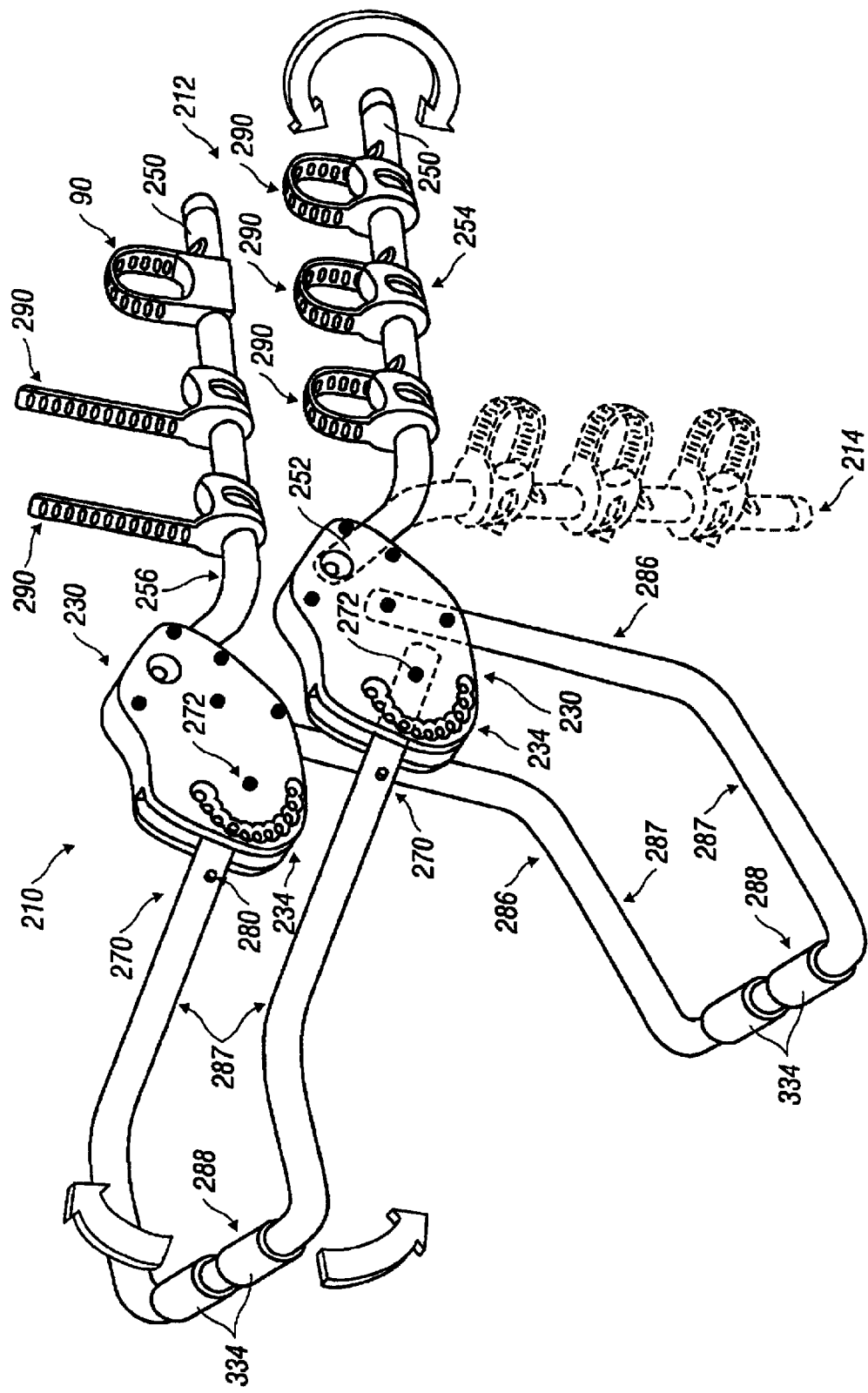
FIG. 13 is a perspective view of an alternative embodiment of a carrier illustrating alternative and/or additional inventions to that embodiment depicted in FIG. 1.

A second exemplary embodiment for a load carrier arrangement 210 is illustrated in FIG. 13 which exemplifies several of the same inventions as that depicted in the carrier design shown in FIG. 1, as well as several additional inventive component designs, arrangements and utilizations. The carrier 210 includes a hub 230 that serves as the joining component between a load carrying member 250 and first and second support members 270, 286. Two orientations of the carrier 210 are shown in FIG. 13; in solid lines, two load carrying members 250 are shown projecting to the right in a load carrying orientation 212. In broken lines, the most nearly positioned of the carrying members 250 is shown rotated, or twisted down into a storable orientation 214.

Each of the two load carrying members 250 includes an insert portion 252 and a load carrying portion 254 with an angle 256 interposed therebetween. In one embodiment, the load carrying members 250 are constructed from cylindrical tubing, preferably of metal construction, that has been bent to establish the angle 256.

The hub 230 houses a substantially cylindrically-shaped socket 232 therein. The socket 232 is configured to receive the insert portion 252 of a load carrying member 250. Because relative rotation of the insert portion 252 within the socket 232 is required, both the socket 232 and insert portion 252 are preferably cylindrical in shape. When the word "substantially" is used herein in conjunction with these two components, it is intended that departures from an exact cylindrical shape is possible, but the capability for rotation or twist of the insert portion 252 in the socket 232 must be maintained.

A primary feature of the load carrier arrangement 210 is enabled by the cooperation of the load carrying member 250 in the socket 232 of the hub 230. As has been described hereinabove, in one embodiment, twisting action of the insert portion 252 in the socket 232 transitions the load carrying member 250 from the load carrying orientation 212 to the storable orientation 214. It should be appreciated that while a twist-indicating, double-headed arrow is shown at the distal end of the carrying member 250 in FIG. 13, the twisting action actually occurs about the insert portion 252 of the carrying member 250.

In a preferred embodiment, the angle 256 measures approximately forty-five degrees. As a result, by twisting the insert portion 252 approximately one hundred and eighty degrees, the load carrying portion 254 of the member 250 is transitioned to a substantially perpendicular orientation relative to the starting position. It should be appreciated that more minor twist positioning of the insert portion 252 will result in adjustments to the orientation of the carrying member 250. Therefore, the relative orientation of the load carrying portion 254 can easily be adjusted by a simple twist of the insert portion 252.

A locking arrangement is provided between the hub 230 and the carrying member 250 through the inclusion of a locking pin 236 on the hub 230 and a first receiving aperture 258 on the insert portion 252 of the member 250. When properly positioned within the socket 232 and moved to the load carrying orientation 212, the first aperture 258 is aligned with the locking pin 236 which is then to be inserted therein under the action of an inwardly biasing spring member. Release from this locked configuration is accomplished by an operator grasping a head 237 of the locking pin 236 and retracting the pin 236 from the aperture 258. The operator's grasping of the head 237 is facilitated by a recess 238 in the surface of the hub 230 located about the head 237. In this way, the head 237 is otherwise protected from inadvertent release because it is sunk within the recess 238 below the surface level of the hub 230.

In at least one embodiment, a second aperture 260 is provided in the insert portion 252 of the carrying member 250 at an opposed location to the first aperture 258. This second aperture 260 corresponds to the storable orientation 214 when aligned with the locking pin 236. By insertion of the locking pin 236 into the second aperture 260, a locked storable orientation 214 is achieved. This should be contrasted to known designs in which carrying arms are permitted to pivot or drop out of the carrying orientation, but then they are permitted to flop about without restraint. The capability of the present intention to lock the load carrying member 250 in the storable orientation is a significant improvement over these unrestrained designs.

A plurality of bicycle receiving cradles 290 are shown installed upon each of the carrying members 250. In practice, one or more cradles 290 may be installed on either of the load carrying members 250. As will be addressed in greater detail hereinbelow, an alternative appearance and design is represented by the cradles 290 positioned on the nearest carrying member 250 as shown in FIG. 13. It should be appreciated, however, that the earlier described embodiment for a bicycle receiving cradle 90 may be substituted therefore as is illustrated in the most distally positioned cradle 90 on the farther away carrying member 250 of FIG. 13.

It should be appreciated that the retaining strap 294 portion of the cradle 290 extends in a substantially upstanding orientation under unaffected conditions, but may be bent over by an operator and secured to a base 292 of the cradle 290 for establishing a bicycle frame securing configuration of the cradle 290.

Still referring to FIG. 13, but turning to the aspect of the support members 270, 286, it should be appreciated that a pair of first support members 287 are joined together by a bight portion 288 which in the aggregate form a substantially U-shaped frame member. As shown, each of the support members 287 cooperates with a hub 230. Padding cushions 334 are positioned upon the bight portion 288 for buffering engagement with the transporting vehicle. As illustrated, a pair of second support members 286 are similarly configured, but differ in their connection to the respective hubs 230 as will be described in greater detail.

Each first support member 270 defines an interior space 271 and is pivotally connected to a hub 230 at a pivotation point 272 by a rivet or similar axle-establishing component. A plurality of apertures 234 are provided in the hub 230 that extend outward from a recess into which the first support member 270 extends into an interior region of the hub 230 and through a wall of the hub 230 to an exterior surface of the hub 230. The apertures are arranged in a series about the pivotation point 272 on a rounded arc.

An insert pin 274 is located on the first support member 270. The insert pin 274 has a projecting portion 275 and a root end 276 that is anchored on a biasing member 278. The biasing member 278 preferably takes the form of a leaf-type spring which is located in the interior space 271 of the support member 270. A through-hole is provided across the wall of the support member 270 that permits the projecting portion 275 of the insert pin 274 to extend outside the member 270. The location of the pin 274 on the member 270 is such that it is aligned with the series of apertures 234 in the hub 230. Because of the spring 278, the insert pin 274 will become engaged into any one of the apertures of the series 234 when ever brought into registration therewith.

In order to facilitate disengagement of the insert pin 274 out of an aperture 234, a push pin 280 similarly configured to the insert pin 274 is depressed by the operator. The push pin 280 is located on the support member 270 at a distance sufficiently far from the pivotation point 272 that the pin 280 is positioned outside the hub 230. The push pin 280 includes a projecting portion 282 and a root end 284 configured with relationship to the spring 278 substantially like to the insert pin 274. Because the push pin 280 is positioned upon the spring 278 substantially adjacent to the insert pin 274, and the effective length of the push pin 280 is greater than the insert pin 274, depression of the push pin 280 causes retraction of the insert pin 274 back into the interior space of the first support member 270 and out of engagement with any aperture 234 with which mating engagement had been previously achieved.

Each of the apertures 234 may be marked to serve as indicia of particular configurations such as fits to certain vehicles. As described hereinabove with respect to the arrangement for providing similar indicia in the alternative embodiment of FIG. 6, fit guides may be generated which show which marked aperture 234 or 60 should be engaged for proper fit to a certain vehicle. This illustrates another inventive aspect disclosed herein; that is, the enablement of a single fit guide being maintained, but which is made universal to a plurality of different carriers because of like indicia marking schemes. That is, like markings are coordinated across several different carriers so when any one of the carriers are set to an indicated marking from the fit guide, the carrier will be set to a configuration appropriate for the looked-up reference, such as the type of vehicle the user desires to mount the carrier upon.

Referring again to FIG. 13, but now turning to the second support member 286, it should be appreciated that a similar configuration is utilized for the second support member 286 as the first support member 270, but the second support member 286 is fixedly anchored in the hub 230 utilizing in the illustrated embodiment, two rivets 240 that also serve to secure two halves of the hub 230 together.

Figure 14:
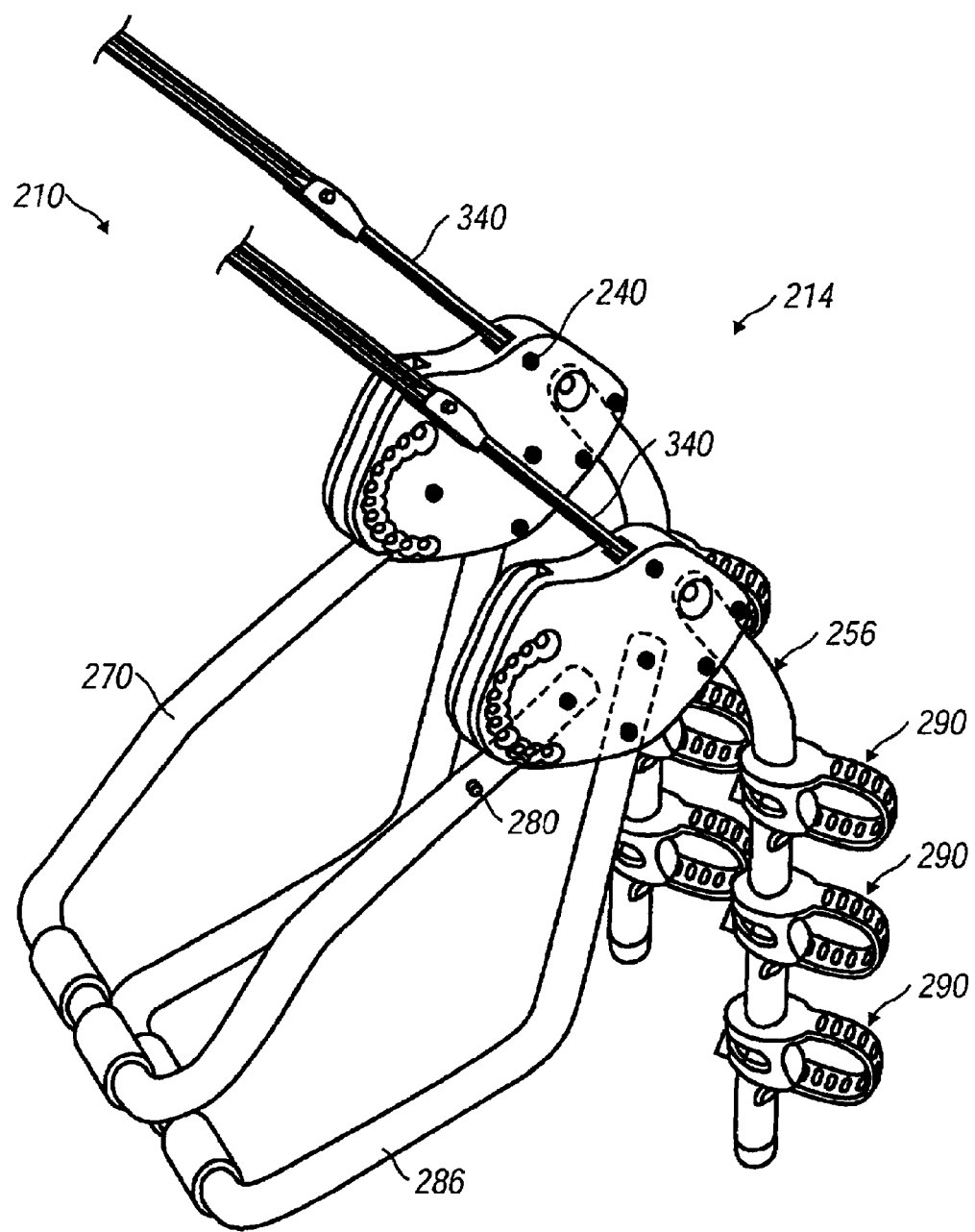
FIG. 14 is a perspective view of that carrier of FIG. 13 shown in a collapsed, ready to be stored or transported orientation.
Figure 19:
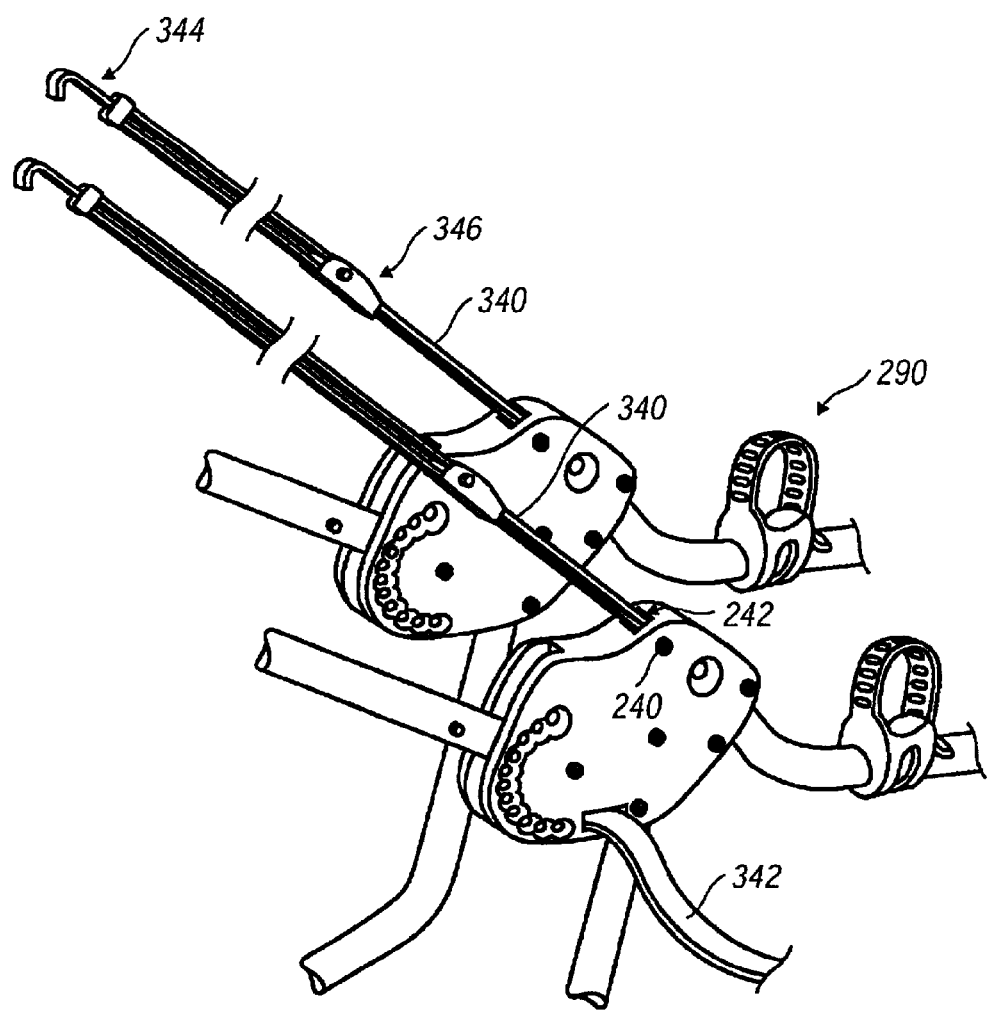
FIG. 19 is a perspective view of a top portion of a carrier hub substantially similar to that shown in FIG. 13 illustrating an anchoring strap secured within the body of the hub by a loop formed in the end of the strap and which is secured by a rivet used in the hub's assembly.

Referring to FIG. 14, the load carrier arrangement 210 may be appreciated as being arranged into the storable orientation 214. Another aspect is depicted in FIG. 14, as well as FIG. 19 regarding a securement arrangement for upper 340 and lower 342 securing straps to the hub 230. From these two figures, a recess into the interior space of the hub 230 at a rivet 240 may be appreciated. The securing straps 340, 342 are of conventional design, but with a loop provided at the end connected to the hub 230. The loop is anchored by the rivet 240 which serves as an axle about which the looped-strap is able to twist or rotate. The strap may be looped around the rivet 240, or the rivet 240 may be inserted through the loop during the hub's 230 assembly. In either event, this arrangement for securing an anchoring strap to the hub 230 provides a substantial benefit in that it avoids twisting action traditionally imposed upon the load carrier arrangement 210 when clipped attachment to the vehicle was necessarily attached with inboard or outboard of the hub assemblies. This improved effect is facilitated because the straps are now enabled to extend substantially parallel to a long axis of the hub 230, which is substantially parallel with the long axis of the carrying vehicle, when conventionally designed hooks 344 are secured thereto. As in other conventionally designed cinchable strap arrangements, adjusting buckles 346 are also incorporated for accommodating proper fit to different vehicles.

Figure 15:
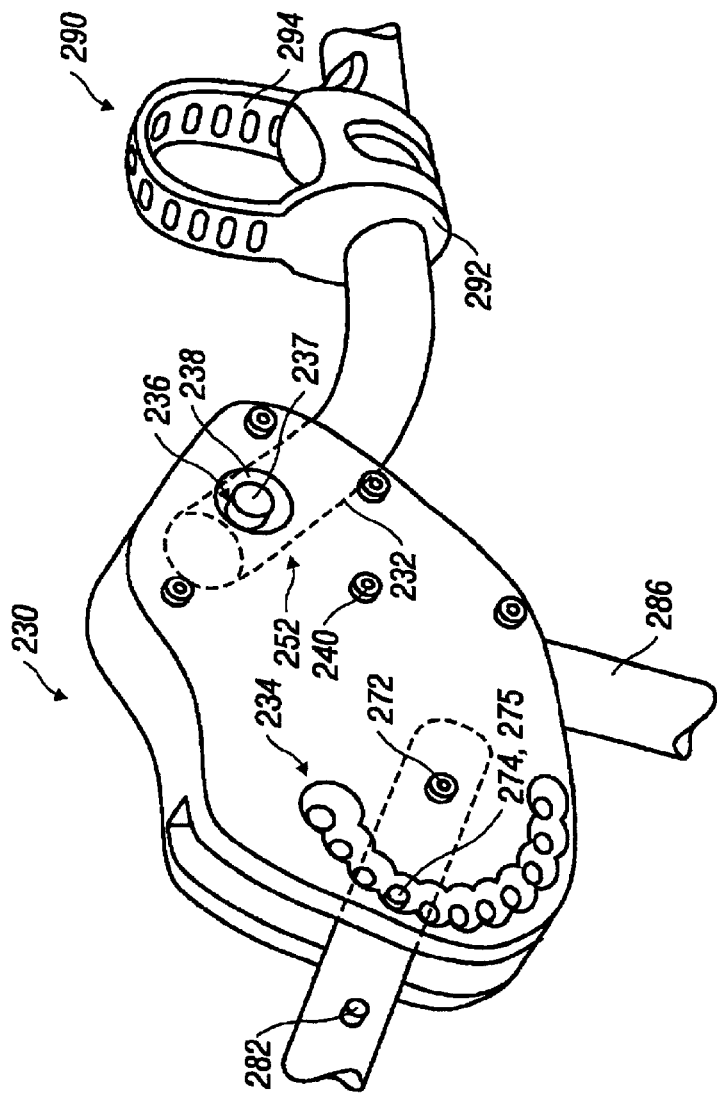
FIG. 15 is a detailed perspective view of the hub of that carrier of FIG. 13 showing certain internal features in broken lines.

FIG. 15 is provided to illustrate the details of the unique arrangement of the hub 230. It should be appreciated that two such hubs 230 are included in the load carrier arrangement 210. The uniqueness of the individual hub arrangement 230 is, however, considered to be an inventive design in and of itself.

Figure 16:
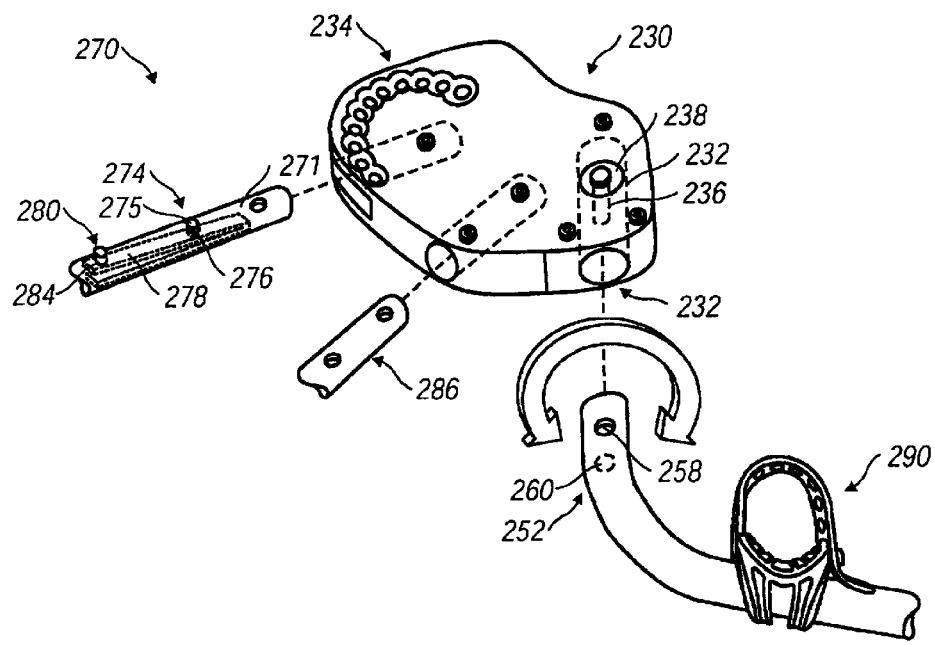
FIG. 16 is an exploded perspective view of the hub depicted in FIG. 15, with additional internal features of the hub, as well as components connectable thereto, shown in broken lines.

FIG. 16, which is an exploded view of this unique hub 230 clearly demonstrates the interaction between the several components that are joined together by the hub 230. For instance, an exemplary design of a leaf spring 278 is shown positioned in the interior space 271 of the first support member 270. Similarly, both the insert pin 274 and the pushpin 280, together with their respective projecting portions and root ends, are shown cooperate together during operation for fixing relative orientations of the carrier 210 through cooperation with the plurality of apertures 234. Still further, an exemplary location and orientation of the substantially cylindrically-shaped socket 232 is shown with the associated locking pin 236 with its graspable head 237 located in the surrounding recess 238. The first 258 and second 260 apertures which are located on opposite sides of the insert portion 252 of the carrying member 250 are also shown as they are provided for co-operation with the locking pin 236. A double-headed arrow is provided indicating the twisting or rotating action of the load carrying member 250 in its receiving socket 232.

Figure 17:
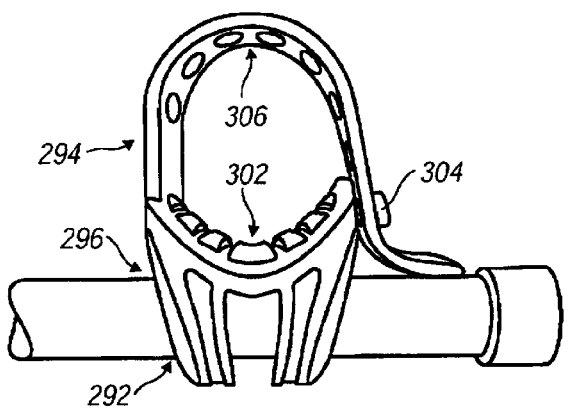
FIG. 17 is an elevational, perspective view of an exemplary embodiment of the cradle employed in the exemplary carrier of FIG. 13.
Figure 18:
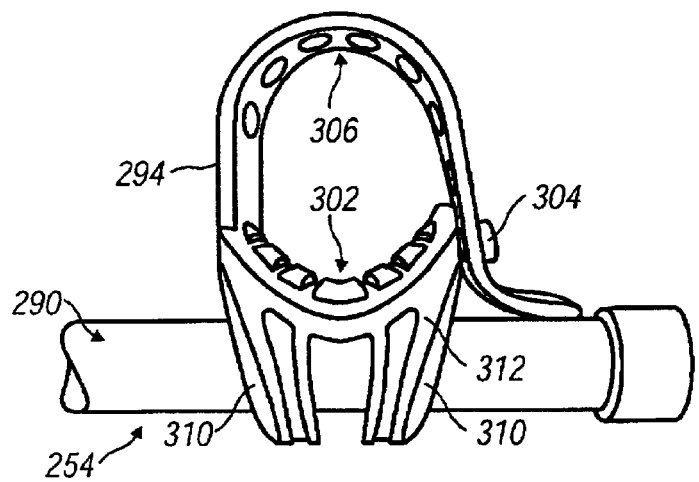
FIG. 18 is an elevational, perspective view of the cradle of FIG. 17 illustrating that cradle's two-piece construction.

An alternative embodiment to the cradle 90 is illustrated in FIGS. 17 and 18. Therein, a unique unibody design of one-piece construction is shown in FIG. 17, while a two-piece construction is shown in FIG. 18. In common between the designs is a through-hole 296, a ribbed bicycle-receiving or engaging surface 302 on a base 292, and a retaining strap 294. A fastening tab 304 is provided on the base 292 and a series of apertures or fastening holes 306 are provided in the retaining strap 294. Together the apertures 306 selectively cooperate with the tab 304 for a custom fit about a frame member of a bicycle carried thereupon.

The alternative embodiment of FIG. 18 depicts a multi-piece cradle 290, exemplarily shown as a two-piece construction. A primary portion of the base 292 is constituted as an elastomeric buffering semi-flexible component 312 at least partially surrounded by a truncated V-shaped fortifying and substantially rigid component 310. As shown, the elastomeric buffering component 312 is made of one-piece construction together with the retaining strap 294. The two sides of the fortifying and substantially rigid cradle components 310 are oriented at an angle with respect to vertical, which also institutes an angle between these fortifying components 310 and a long axis of the cradle 290. Because of this orientation, pulling forces exerted by the retaining strap 294 on a half of the more rigid component causes a lower end, which is toed inward, to be biased outward. This biasing of the lower end of one side of the more rigid component causes a binding effect between that component and the load carrying portion 254 of the carrying member 250 upon which it is located. This is a substantial benefit in that the pulling action on the retaining strap 294 is usually caused by the load, such as a carried bicycle, tending to be dislocated therefrom. Without this binding effect, the cradle 290 is more apt to slide upon the carrying member 250. Still further, the greater the pull on the one side of the rigid component, the greater the binding effect and the better the cradle 290 serves as an anchor for the secured article, such as a bicycle, to the load carrier arrangement 210.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

Bicycle carriers adapted to be mounted on the back of a vehicle have s been disclosed and their components described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A load carrier arrangement adapted to be carried on a transporting vehicle, said load carrier arrangement comprising:

a hub coupled between a support member and a load carrying member;

said hub having a socket formed therein, said socket being substantially cylindrically-shaped and configured to receive a substantially cylindrically-shaped insert portion of said load carrying member therein;

said load carrying member having an insert portion and a load carrying portion with an angle interposed therebetween which fixes said insert portion and said load carrying portion in non-parallel orientation to one another;

said insert portion of said load carrying member being twistably positioned in said socket thereby enabling twisting action therein which affects a transition between a load carrying orientation and a twist-adjusted orientation;

said support member being pivotally connected to said hub and configured for variable, but discreet operator positioning relative to said hub; and said support member being pivotally connected to said hub at a pivotation point and said hub further comprising a plurality of apertures arranged radially about said pivotation point for utilization by an operator in said variable, but discreet positioning of said support member relative to said hub.

2. A load carrier arrangement adapted to be carried on a transporting vehicle, said load carrier arrangement comprising:

a hub coupled between a support member and a load carrying member;

said hub having a socket formed therein, said socket being substantially cylindrically-shaped and configured to receive a substantially cylindrically-shaped insert portion of said load carrying member therein;

said load carrying member having an insert portion and a load carrying portion with an angle interposed therebetween which fixes said insert portion and said load carrying portion in non-parallel orientation to one another;

said insert portion of said load carrying member being twistably positioned in said socket thereby enabling twisting action therein which affects a transition between a load carrying orientation and a storable orientation; and said angle interposed between said insert portion and said load carrying portion measuring approximately forty-five degrees so that a one-hundred and eighty degree twist of said insert portion in said socket causes said load carrying portion to transition between approximately perpendicular orientations.

3. A load carrier adapted to be carried on a transporting vehicle, said load carrier comprising:

a hub coupled between a support member and a load carrying member, said support member be inn configured to be mounted to a backend of a carrying vehicle;

said hub having a socket formed therein, said socket being substantially cylindrically-shaped and configured to receive a substantially cylindrically-shaped insert portion of said load carrying member therein;

said load carrying member having an insert portion fixed to a load carrying portion with an angle interposed between longitudinal axes of said portions, said angle which fixes said insert portion and said load carrying portion in non-parallel and non-perpendicular orientation to one another;

said insert portion of said load carrying member being twistably positioned in said socket thereby enabling twisting action therein which affects a transition between a load carrying orientation and a storable orientation; and said angle interposed between said longitudinal axes of said insert portion and said load carrying portion measuring approximately forty-five degrees.

4. A load carrier adapted to be carried on a transporting vehicle, said load carrier comprising:

a hub coupled between a support member and a load carrying member, said support member being configured to be mounted to a backend of a carrying vehicle;

said hub having a socket formed therein, said socket being substantially cylindrically-shaped and configured to receive a substantially cylindrically-shaped insert portion of said load carrying member therein;

said load carrying member having an insert portion fixed to a load carrying portion with an angle interposed between longitudinal axes of said portions, said angle which fixes said insert portion and said load carrying portion in non-parallel and non-perpendicular orientation to one another;

said insert portion of said load carrying member being twistably positioned in said socket thereby enabling twisting action therein which affects a transition between a load carrying orientation and a storable orientation; and said longitudinal axes of said insert portion being positioned in a plane oriented substantially parallel to a direction of travel of a carrying vehicle.

5. A load carrier adapted to be carried on a transporting vehicle, said load carrier comprising:

a pair of hubs, each of said hubs of said pair of hubs being coupled between a support member and a load carrying member, each support member being configured to be mounted to a backend of a carrying vehicle;

each of said hubs having a socket formed therein, each socket being substantially cylindrically-shaped and configured to receive a substantially cylindrically-shaped insert portion of a load carrying member therein;

each of said load carrying members having an insert portion fixed to a load carrying portion with an angle interposed between longitudinal axes of said portions, each angle fixing a respective insert portion and load carrying portion in non-parallel and non-perpendicular orientation one to the other; and each insert portion being twistably positioned in a socket thereby enabling twisting action therein which affects a transition of said rear-mount vehicular load carrier between a load carrying orientation and a storable orientation.

6. The load carrier arrangement as recited in claim 1 further comprising:

said angle interposed between said insert portion and said load carrying portion measuring approximately forty-five degrees so that a one-hundred and eighty degree twist of said insert portion in said socket causes said load carrying portion to transition between approximately perpendicular orientations.

7. The load carrier arrangement as recited in claim 1 further comprising:

said angle interposed between said insert portion and said load carrying portion measuring approximately forty-five degrees so that a less than ninety degree twist of said insert portion in said socket causes said load carrying portion to transition between two different load carrying orientations.

8. The load carrier arrangement as recited in claims 1, 2, 3, 4 or 5 further comprising:

said load carrying member being constructed from substantially cylindrically-shaped tubing having a bend therein, said bend forming said angle that is interposed between said insert portion and said load carrying portion.

9. The load carrier arrangement as recited in claims 1, 2, 3, 4, or 5 further comprising:

said support member having at least one insert pin carried thereupon and adapted to be insertibly received in each of said plurality of apertures arranged radially about said pivotation point.

10. The load carrier arrangement as recited in claims 1, 2, 3, 4, or 5 further comprising:

each support member having an insert pin carried thereupon and adapted to be insertibly received in each of said plurality of apertures arranged radially about said pivotation point, said insert pin having a projecting portion extending outside said support member and a root end coupled to a biasing member that is housed inside said support member and that urges said projection portion outwardly from said support member and into inserted engagement into any one of said plurality of apertures arranged radially about said pivotation point when properly aligned therewith.

11. The load carrier arrangement as recited in claim 10 further comprising:

said support member having a push pin carried thereupon, said push pin having a projecting portion extending outside said support member and a root end coupled to said biasing member that is housed inside said support member;

said push pin being positioned further away from said pivotation point than said insert pin on said support member and sufficiently far away from said pivotation point that said push pin is located beyond said hub; and said push pin and said insert pin being arranged relative to one another on said biasing member so that depression of said push pin by an operator causes retraction of said insert pin from an engaging orientation with respect to said plurality of apertures.

12. The load carrier arrangement as recited in claim 11 further comprising:

said biasing member taking the form of a leaf-type spring housed within an interior space of said support member.

13. The load carrier arrangement as recited in claims 1, 2, 3, 4 or 5 further comprising:

a cradle for a bicycle positioned on said load carrying member and adapted for cradling a bicycle frame on a base of said cradle, said base having a substantially upwardly open bicycle-engaging surface; and a retaining strap at least partially extending upwardly from said base and positioned away from said base in an open configuration thereby permitting a bicycle to be inserted onto said bicycle-engaging surface in said open configuration, said retaining strap being sufficiently flexible to be bent across said bicycle-engaging surface to retain a bicycle frame thereon, said strap including a fastener for fastening said retaining strap in a bicycle frame-retaining configuration.

14. The load carrier arrangement as recited in claims 1, 2, 3, 4, or 5 further comprising:

a cradle for a bicycle positioned on said load carrying member, said cradle configured to be mounted on a substantially cylindrically shaped part of said load carrying portion of said load carrying member and said cradle being further configured to cradle a substantially round-shaped bicycle frame member on a base of said cradle, said base having a substantially upwardly open bicycle-engaging surface adapted to engage a substantially round-shaped bicycle frame member; and a retaining strap at least partially extending upwardly from said base and positioned away from said base sufficiently to establish an open configuration thereby permitting a bicycle frame member to be placed upon said bicycle-engaging surface in said open configuration, said retaining strap being sufficiently flexible to be bent across said bicycle-engaging surface to retain a bicycle frame thereon, said strap including a fastener for fastening said retaining strap in a bicycle frame-retaining configuration.

15. The load carrier arrangement as recited in claim 14 wherein said load base includes a round-shaped through-hole into which said substantially cylindrically shaped part of said load carrying portion of said load carrying member is extendable, said round-shaped through-hole being adapted for a snug frictional fit between said base and said load carrying member so that said base is slidable along said load carrying member and is restrainable in a position upon said load carrying member by said friction fit.

16. The load carrier arrangement as recited in claim 14 wherein said restraining strap further comprises a series of apertures located along a length thereof, each of said apertures being substantially rectangular in shape.

17. The load carrier arrangement as recited in claims 1, 2, 3, 4 or 5 further comprising:

each insert portion of said load carrying member having a first aperture therein;

said hub having a locking pin, said first aperture and said locking pin arranged for alignment with one another for locking engagement in said load carrying orientation.

18. The load carrier arrangement as recited in claim 17 further comprising:

each insert portion of said load carrying member having a second aperture therein;

said second aperture and said locking pin arranged for alignment with one another for locking engagement in a storable orientation of said load carrier arrangement.

19. The load carrier arrangement as recited in claim 18 further comprising:

said first and said second apertures being opposingly arranged one to the other on said load carrying member.

20. The load carrier arrangement as recited in claim 18 further comprising:

said first and said second apertures being arranged at one hundred and eighty degrees to one another on said load carrying member.

21. The load carrier as recited in claims 2, 3, 4 or 5 further comprising:

said load carrying portion being elevationally positioned below said insert portion in said storable orientation.

* * * * *